March 16, 1954  F. K. MINERLEY  2,671,926
VACUUM OPERATED VENETIAN BLIND BRUSH
Filed Feb. 12, 1952
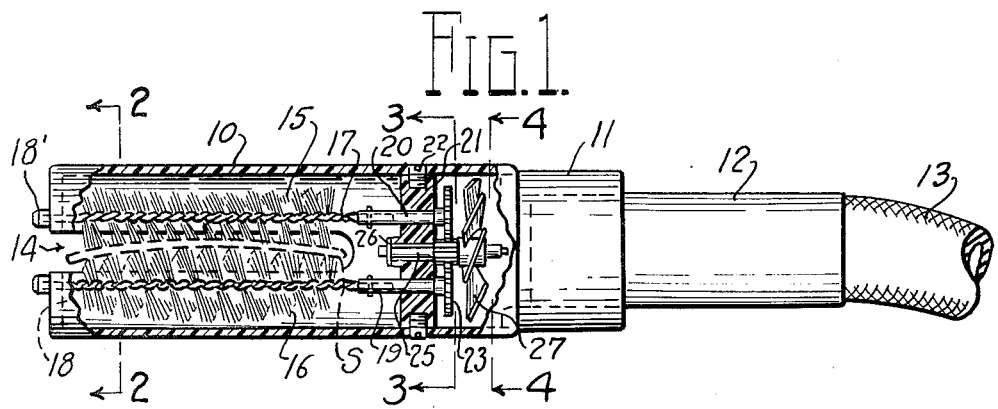
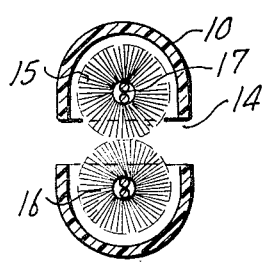
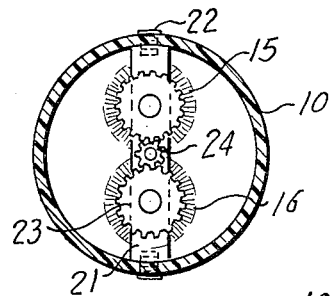
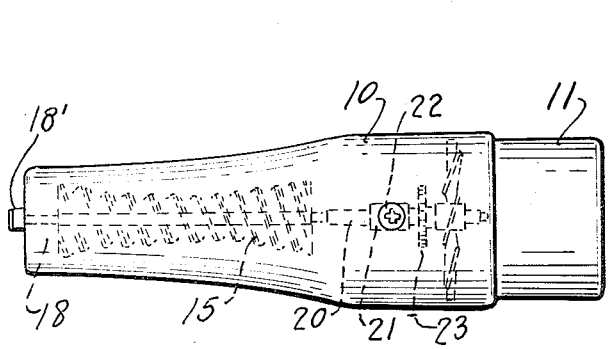
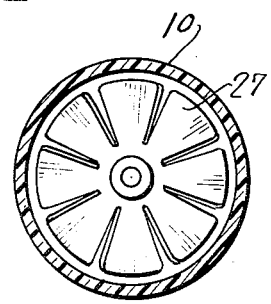
INVENTOR.
Frederick K. Minerley
BY
Malcolm W. Fraser
ATTORNEY Patented Mar. 16, 1954

2,671,926

UNITED STATES PATENT OFFICE 2,671,926

VACUUM OPERATED VENETIAN BLIND BRUSH

Frederick K. Minerley, Lincolnwood, Ill.

Application February 12, 1952, Serial No. 271,190

1 Claim. (Cl. 15—387)

This invention relates to devices for cleaning Venetian blind slats, but more particularly to a brush attachment for vacuum cleaners for this purpose.

An object is to produce an attachment for vacuum cleaners embodying rotary brush means for cleaning Venetian blind slats which are arched transversely.

Another object is to produce a new and improved rotary Venetian blind brush constituting an attachment to a portable vacuum cleaner and which is adapted intimately to engage opposite sides of the Venetian blind slat for thoroughly loosening and removing the dirt simultaneously from both sides thereof.

Other objects and advantages of the invention will hereinafter appear, and for purposes of illustration but not of limitation, an embodiment of the invention is shown on the accompanying drawings, in which Figure 1 is a side elevation partly in section of a Venetian blind brush connected to the flexible hose of a portable vacuum cleaner;

Figure 2 is a transverse sectional view on the line 2—2 of Figure 1;

Figure 3 is a transverse sectional view on the line 3—3 of Figure 1;

Figure 4 is a transverse sectional view on the line 4—4 of Figure 1; and

Figure 5 is a plan view of the tool viewed from a different angle and showing by broken lines the working parts.

The illustrated embodiment of the invention comprises a Venetian blind cleaner having a housing 10 which may be of plastic or other suitable sheet material and has a collar 11 at one end telescopically to receive an elongate sleeve 12 having a flexible hose 13 which is adapted to be connected at its opposite end to a portable vacuum cleaner for creating a suction through the hose in the direction of the cleaner, as will be readily understood. At the forward end of the housing 10 is a slit 14, the sides of which are spaced apart and are adapted to receive a Venetian blind slat S therebetween substantially as shown in Figure 1. As shown in Figure 5, the front end portion of the housing 10 is substantially reduced in size, the same tapering from the rear end portion not only to reduce the size and weight of the tool, but also to enhance its appearance.

Arranged within the housing 10 is a pair of brushes 15 and 16, one being disposed on each side of the slit 14 and each brush is in the form of a unit having a wire shaft 17 which projects beyond opposite ends of each brush. An important feature of this invention resides in forming the exterior of the brush 15 concave and the exterior of the brush 16 convex, the two brushes being so formed as substantially to fit together. Thus when an arched slat S is engaged by the brushes 15 and 16, both sides will be intimately engaged by the brushes for thoroughly and efficiently removing the dirt therefrom, substantially throughout the width of the slat.

The outer end of the housing 10 is closed by end walls 18 in which the projecting ends of the shafts 17 are rotatively mounted in suitable bearing caps 18'. The opposite ends of the shafts 17 project into recessed ends 19 of gear shafts 20, the brush shafts being retained in place by transverse pins substantally as shown on Figure 1. The gear shafts 20 are rotatable in a relatively narrow partition 21 which is securely held in place by screws 22 extending through the walls of the housing 10 and into the end portions of the partition.

On the inner side of the gear shafts 20 are spur gears 23 which engage a central gear 24 mounted on a tubular shaft 25 which extends through the partition 21 and is held from movement by a washer and pin assembly 26. The gear 24 is of somewhat larger diameter than that of the shaft 25 so that it will thus be apparent that endwise movement of the shaft 25 and associated parts is prevented. Fixed to the inner end of the gear 24 is a multi-vaned air wheel 27 which rotates in response to the movement of the stream of air through the housing, as will be readily understood.

From the above description, it will be manifest that I have produced an exceedingly simple and efficient device for cleaning transversely arched Venetian blind slats. By forming one of the brushes exteriorly convex and the other one conformingly concave, it will be clear that arched slats may be readily cleaned thoroughly throughout their widths in an extremely efficient manner. The construction is such that the brushes can be replaced, thereby greatly extending the life of the tool. The parts can be conveniently assembled and the number has been kept to a minimum so on a quantity basis, the device can be produced inexpensively. It will be noted that this simple gear arrangement will cause one brush to revolve clockwise, the other counter-clockwise, and thus preventing the tool from running along the slat and making the tool extremely easy to control.

It is to be understood that numerous changes in details of construction, arrangement and operation may be effected without departing from

What I claim is:

A suction operated cleaner for transversely arched Venetian blind slats comprising a tubular housing adapted to be connected at one end to a source of suction and having an elongate slit at the opposite end for receiving an arched slat, the entire stream of air created by the suction source passing into said housing through said slit, a pair of brushes arranged within said housing, one on each side of the slit and having their axes parallel, one brush being exteriorly convex and the other concave, thereby intimately to engage opposite sides of the arched slat, end wall means for the housing closing the outer end thereof except for the slit, bearing means for the outer ends of said brushes in said end wall means, a partition in said housing spaced from said end wall means providing bearing means for the opposite ends of said brushes, an air wheel constituting an air motor and mounted on the inner side of the partition with its axis parallel to the axes of said brushes, there being relatively free air flow between the region of the brushes and the air wheel, and gear means carried by the partition providing an operative connection between said air wheel and said brushes.

FREDERICK K. MINERLEY.

References Cited in the file of this patent

UNITED STATES PATENTS

| Number | Name | Date |
| --- | --- | --- |
| 952,592 | Villani | Mar. 22, 1910 |
| 2,153,303 | Fielding | Apr. 4, 1939 |
| 2,246,036 | Farrell | June 17, 1941 |